United States Patent
Hernandez (10) Patent No.: US 11,742,641 B2
(45) Date of Patent: Aug. 29, 2023

(54) BRANCH BLOCK

(71) Applicant: RHL Holdings, LLC, North Palm Beach, FL (US)

(72) Inventor: Rigoberto Hernandez, North Palm Beach, FL (US)

(73) Assignee: RHL Holdings, LLC, North Palm Beach, FL (US)

( * ) Notice: Subject to any disclaimer, the term of this patent is extended or adjusted under 35 U.S.C. 154(b) by 1195 days.

(21) Appl. No.: 16/281,973

(22) Filed: Feb. 21, 2019

(65) Prior Publication Data

US 2019/0257460 A1 Aug. 22, 2019

Related U.S. Application Data

(60) Provisional application No. 62/646,565, filed on Mar. 22, 2018, provisional application No. 62/633,440, filed on Feb. 21, 2018.

(51) Int. Cl.
*H02G 3/04* (2006.01)
*H02G 3/18* (2006.01)
*H02G 3/08* (2006.01)

(52) U.S. Cl.
CPC .............. *H02G 3/045* (2013.01); *H02G 3/04* (2013.01); *H02G 3/0437* (2013.01); *H02G 3/0462* (2013.01); *H02G 3/088* (2013.01); *H02G 3/18* (2013.01)

(58) Field of Classification Search
CPC .......... H02G 3/04; H02G 3/0437; H02G 3/45; H02G 3/0462; H02G 3/088; H02G 3/18; H02G 3/045
See application file for complete search history.

(56) References Cited

U.S. PATENT DOCUMENTS

| | | | | | |
|---|---|---|---|---|---|
| 1,135,894 | A | * | 4/1915 | Havens ..................... | H02G 3/02 174/152 G |
| 3,395,382 | A | * | 7/1968 | Weagant .............. | H01R 4/5091 174/91 |
| 3,944,261 | A | * | 3/1976 | Reed ...................... | A61M 39/10 285/21.2 |
| 4,288,107 | A | * | 9/1981 | Schwartze ........... | H02G 15/046 285/381.4 |
| 5,714,715 | A | * | 2/1998 | Sundhararajan ..... | H02G 15/046 174/23 R |

(Continued)

*Primary Examiner* — Paresh Paghadal
(74) *Attorney, Agent, or Firm* — McHale & Slavin, P.A.

(57) ABSTRACT

The present invention is related to passages for electrical wires, and more specifically, to a branch block that allows various conduits to be joined while the wires and connections remain separated throughout their path, while and after passing through the branch block. A branch block is generally constructed as a parallelepiped having a plurality of sidewalls, a top wall, and a bottom wall to form a water resistant enclosure having at least one inlet conduit port that branches into two or more independent channels terminating in outlet conduit ports. The diverging nature of the branch points allow wire to be pulled through an outlet conduit, the branch block, and the inlet conduit without opening the branch block. In addition, the wires are generally separated as they pass through the branch block, eliminating cross signals. This construction also provides a sealable structure that is suitable for wet or explosive environments.

15 Claims, 9 Drawing Sheets

(56) References Cited

U.S. PATENT DOCUMENTS

| | | | | |
|---|---|---|---|---|
| 5,897,396 A | * | 4/1999 | Maejima | H01R 13/5208 |
| | | | | 439/275 |
| D514,520 S | * | 2/2006 | Bahramian | H01R 13/5833 |
| | | | | D13/147 |
| D777,110 S | * | 1/2017 | Ferretti | H01R 13/5833 |
| | | | | D13/146 |
| 10,820,482 B2 | * | 11/2020 | Hui | A01C 7/082 |
| 2005/0090152 A1 | * | 4/2005 | Broomall | H01R 24/547 |
| | | | | 439/638 |
| 2013/0170801 A1 | * | 7/2013 | Do | G02B 6/4472 |
| | | | | 385/101 |
| 2014/0076628 A1 | * | 3/2014 | McGrath | H01B 7/0045 |
| | | | | 174/124 R |
| 2018/0011276 A1 | * | 1/2018 | Marchek | G02B 6/4472 |
| 2019/0351845 A1 | * | 11/2019 | Toyoshima | H02G 3/22 |
| 2020/0209501 A1 | * | 7/2020 | Diepstraten | G02B 6/387 |

* cited by examiner

BRANCH BLOCK

RELATED APPLICATIONS

In accordance with 37 C.F.R 1.76, a claim of priority is included in an Application Data Sheet filed concurrently herewith. Accordingly, under 35 U.S.C. §119(e), 120, 121, and/or 365(c) the present invention claims priority of U.S. Patent Application No. 62/633,440, entitled "BRANCH BLOCK", filed on Feb. 21, 2018, and U.S. Patent Application No. 62/646,565, entitled "BRANCH BLOCK", filed on Mar. 22, 2018. The contents of each of the above referenced applications are herein incorporated by reference in its entirety.

FIELD OF THE INVENTION

The present invention relates to electrical enclosures and, in particular, to a water-resistant self-containing electrical enclosure having at least one inlet conduit port that branches into several independent channels and terminates in several outlet conduit ports.

BACKGROUND OF THE INVENTION

Electrical enclosures are critical components of all residential, commercial or industrial electrical systems. There are a variety of electrical enclosures: those constructed of plastic or metal; round, square and octagonal boxes; and boxes with different load ratings. The type of conduit being used often determines the type of electrical enclosure that is required. A junction box is an electrical enclosure used to enclose wire splices and connections therein. Junction boxes must be installed where they are always accessible, and can never be installed in an inaccessible place, such as within a wall or ceiling space, in case a new wire needs to be installed, or in case of a needed repair to a pre-existing wire.

An electrical junction box is typically a hollow box-like enclosure that houses electrical connections, protects those connections, and provides a safety barrier. Conduits connect to the junction box through pre-bored apertures that typically include a knock-out slug that has been partially sheared from the surrounding metal. Once the knock-out slug is removed, conduit is extended into the aperture and a thin threaded nut may be used to secure the conduit to the junction box. Thus, the connection between the junction box and the conduit is not sealed from air or water ingress into the inner chamber of the junction box. Electrical connections and splices to wiring are contained within the hollow portion of the junction box; therefore, it is also fitted with a removable cover to access the interior of the hollow chamber. Various disadvantages exist with junction boxes. For instance, having all splices and connections within the junction box makes for tedious work when trying to figure out which connection might be faulty when there are various lines coming in and out of the junction box. A junction box can have in excess of six lines coming in from different angles, and they are all crowded into and crossing each other within the interior of the junction box. If one line is faulty, it requires patience and skill to figure out which line is faulty if the splices are not individually separated within the junction box. Additionally, should the need exist to add another line through the junction box, an electrician cannot simply push the line through one inlet to the junction box and have it come out the desired outlet of the junction box. The electrician would need to access the junction box, remove the cover, pull the line through the existing lines, and then push the wire through the desired outward conduit before reinstalling the cover. Pushing a wire through a conduit is an almost impossible task, requiring the electrician to pull the wire through each respective conduit to the junction box, and thereafter splice the wires together within the junction box. This procedure often results in an additional failure point for the wiring, and provides for the possibility of mistakes or short circuits across other wires and splices within the junction box. Another issue that results from junction boxes is inadvertent electrical signals being sent through wires crossing within the junction box. Electrical and magnetic fields created around one wire may be transferred to other wires that are positioned in close proximity to each other. This can create false signals to sensitive equipment such as electronics, computers or sensors.

By way of example, if an electrician were to install lights at various locations on a tree, each light would require wiring extending through a conduit from the light, along the tree branch, down the trunk of the tree and, likely, to a junction box just above the ground. This would occur at every light and form an unsightly number of wires from the various lights to the junction box above the ground.

It would be advantageous and aesthetically pleasing to reduce the number of wires that are exposed by providing a branch block enclosure that allows for branching off of wires at a desired location, perhaps along the trunk of the tree; thereby having one conduit running up the trunk into the enclosure at a central location, and then branching off into individual conduits, allowing each individual wire to reach each individual light. The branch block should also allow wires to be pushed or pulled through the branch block after it is installed.

SUMMARY OF THE INVENTION

The present invention is related to passages for electrical wires; and more specifically, to a branch block that allows various conduits to be joined while the wires and connections remain separated throughout their path while and after passing through the branch block. A branch block is generally constructed as a flattened funnel shape having continuous sidewalls, a top wall, and a bottom wall to form a water resistant enclosure having at least one inlet conduit port that branches into two or more independent channels, and terminates in outlet conduit ports. At the base of the funnel is an inlet conduit port, and on the opposite sidewall are at least two conduit outlet ports, whereby each outlet conduit port is independent of the other(s). Each conduit outlet port is defined as an aperture that extends inwardly and has a continuous sidewall for securement of a conduit pipe. In one example, the inlet port is ¾ inch or 1 inch in diameter and terminates at a branch point, whereby two or more independent channels separate therefrom. Outlet conduits of a desired size are connected to the conduit outlet ports. The diverging nature of the branch points allow wire to be pushed or pulled through an outlet conduit, the branch block and the inlet conduit without opening the branch block. In addition, the wires are generally separated as they pass through the branch block, eliminating cross signals that are seen in the prior art junction boxes. This construction also provides a sealable structure that is suitable for wet or explosive environments.

Accordingly, it is an objective of the present invention to provide an electrical enclosure in the form of a branch block.

It is another objective of the present invention to provide a branch block that allows electrical lines to be pulled through the branch block without opening the branch block.

Still another objective of the present invention is to provide a branch block that includes tabs on the outer surface thereof for the purpose of surface mounting.

Another objective of the present invention is to provide a branch block that reduces the chance of short circuits and crossed signals by providing each line that passes through the branch block with its own individual branch port as the wires are extended through the branch block.

Yet another objective of the present invention is to provide a branch block in which the inlet port and branch outlet ports are fitted with O-rings, threaded couplings, push-in fittings, shark bite fittings, or the like, to provide a watertight seal to conduits secured within the ports.

Still yet another objective of the present invention is to provide a branch block that includes one larger inlet port and a plurality of individual branch outlet ports.

Still another objective of the present invention is to provide a branch block that can be installed where junction boxes are not allowed to be installed due to electrical code mandates.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 1:
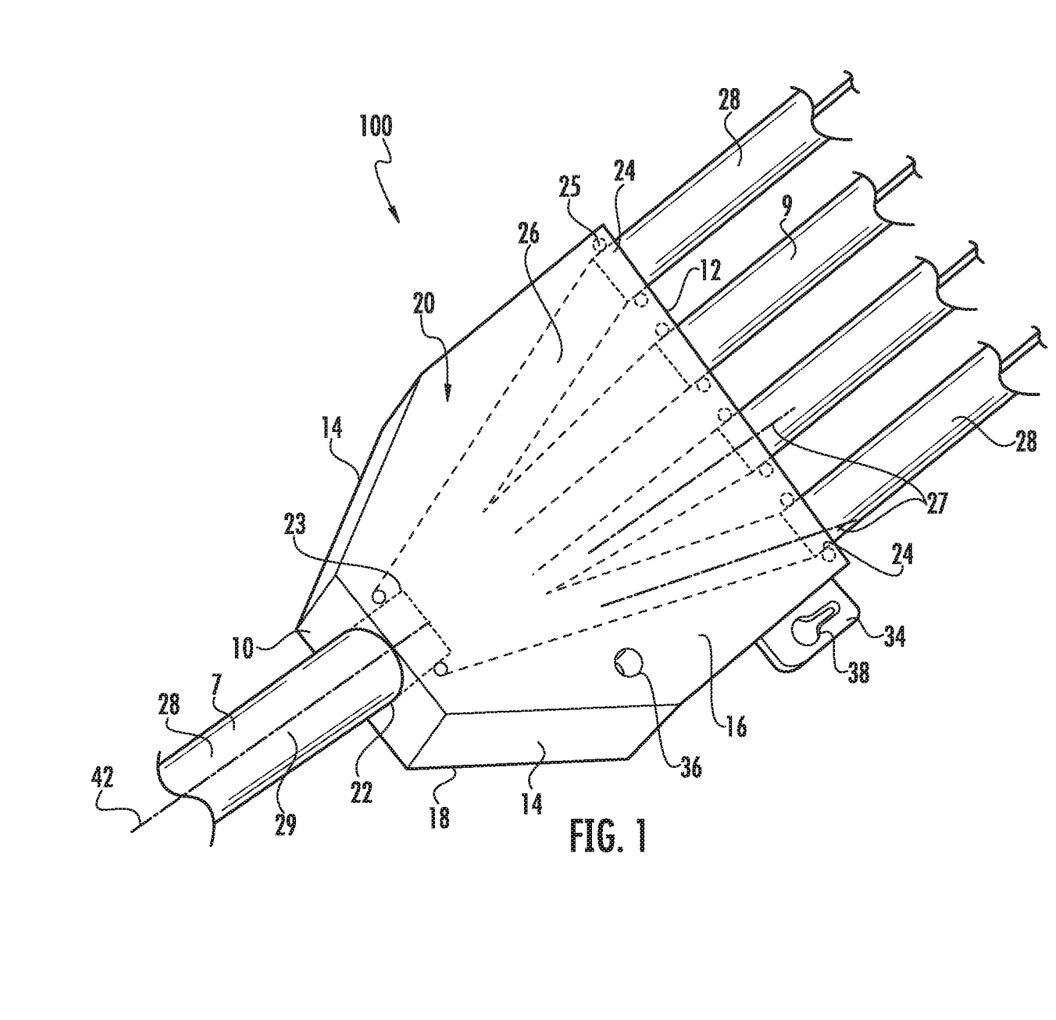
FIG. 1 is a top perspective view of one embodiment of the branch block.
Figure 2:
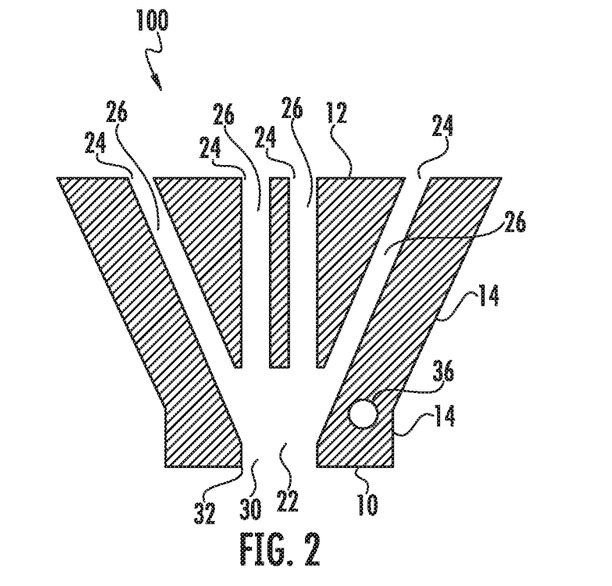
FIG. 2 is a cross-sectional top view of the branch block illustrated in FIG. 1.
Figure 3:
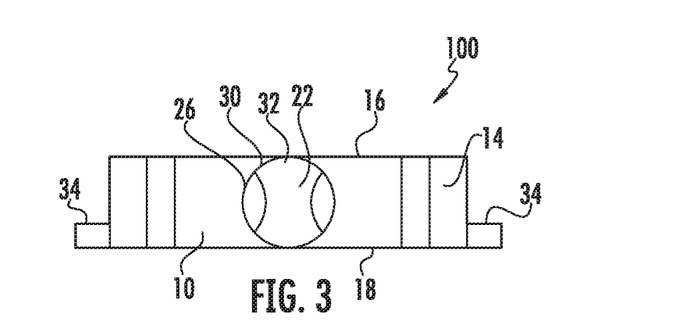
FIG. 3 is a front planar view of the branch block.
Figure 4:
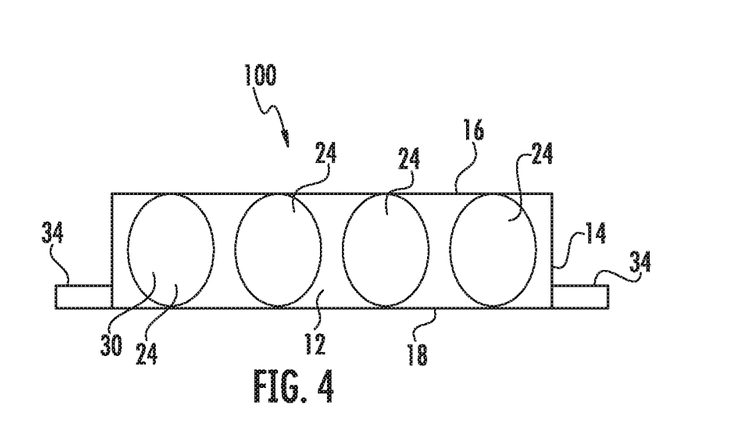
FIG. 4 is a back planar view of the branch block.

Referring now to FIGS. 1-5, the branch block 100 is comprised of a plurality of sidewalls 10, 12, 14, a top wall 16, and a bottom wall 18 to form a water resistant or watertight enclosure 20 having a generally parallelepiped shape, which may include tapered or otherwise shaped sections to closely approximate the shape of the internal ports. The branch block 100 includes at least one inlet port 22 to a primary branch 23 that diverges into a plurality of individual branches 26 terminating in an outlet port 24 for each branch. Each inlet port 22 and each outlet port 24 are shaped and sized to cooperate with electrical conduit 28 of various types to complete a seal between the branch block and the conduit. In this respect, the branch block may include seals 25 in the form of O-rings, packing, compression, shark bite fittings, adhesive and the like. In the preferred embodiment, the seals are constructed and arranged to cooperate with the outside surface of the conduit and the inside surface of the ports 22, 24 to create a watertight, or at least a water resistant, attachment between the branch block 100 and the conduit 28. In some embodiments, the connection between the conduit 28 and the branch block 100 may also be airtight, allowing the internal space to be filled with inert gas. In the preferred embodiment, the primary branch 23 extends into the branch block 100 a short distance and thereafter divides or branches into a plurality of individual branches 26 having a continuous sidewall 32. The longitudinal centerline 27 of the individual branches 26 is preferably oriented at an obtuse angle with respect to the longitudinal centerline 29 of the inlet primary branch 23. In this manner, new wires may be routed or pulled from the individual branches 26 through the primary branch 23 without disassembly of the conduits 28 from the branch block 100. This provides a significant advantage over junction boxes of the prior art, which must be disassembled to reroute new wires through the conduits and the box. The inlet port 22 and outlet ports 24 may be arranged along the longitudinal centerline 27, 29 of the primary and individual branches 23, 26, or they be arranged at an angle with respect thereto, both arrangements are illustrated in FIG. 1, without departing from the scope of the invention. This construction provides flexibility with respect to the arrangement of the conduits, allowing them to flow outwardly from the branch block in several desired configurations that closely approximate the surfaces to which they are being attached for a smoother, more refined, appearance. The branch block 100 may be constructed to include a large inlet conduit 7 for code requirements, while the outlet conduits 9 are smaller in size due to the amount of wires being divided from the inlet conduit to the outlet conduits as per code requirements. This construction saves materials by not requiring all of the conduits to be the same size, while still conforming to local code requirements. This construction also provides the wires extending through each outlet conduit with a substantially separate passageway through the branch block 100 to reduce electrical interference between the wires. The branch block 100 may be attached to a surface in a variety of ways, including tabs 34 or apertures 36 that extend through the body of the branch block 100. Keyway slots 38, tie wraps or the like may also be utilized, as is known in the art, for attaching the branch block to a desired surface or object. The branch block 100 is preferably constructed from a polymer, such as plastic, which may be glass or otherwise filled through the process of injection molding. However, it should be noted that the branch block 100 may be constructed from other materials suitable for use in the electrical field without departing from the scope of the invention.

Figure 5:
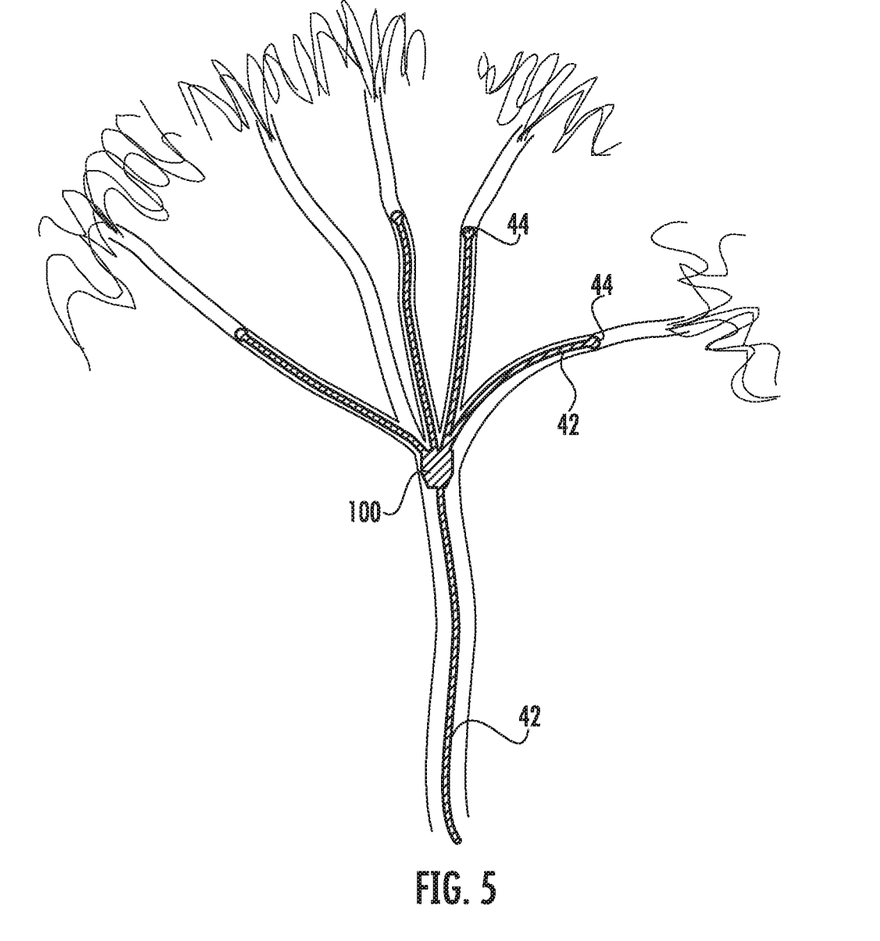
FIG. 5 is a pictorial representation of the branch block in use.

By way of example, if an electrician were to install lights at various locations on a tree, each light would require wiring from the light, along the tree branch, down the trunk of the tree and, likely, to a junction box just above the ground. This would occur at every light and form an unsightly number of wires from the light to the junction box. It would be advantageous and aesthetically pleasing to reduce the number of wires that are exposed by utilizing the present branch block 100 that allows for branching off electrical lines at a central location along the trunk of the tree. As shown in FIGS. 1 and 5, in use, electrical lines from each individual light 44 on a tree branch would be routed to the branch block 100. At the branch block 100, each electrical line 42 would be fed through its own outlet port 24 through the corresponding channel 26, and exit from the inlet port 22; thereby consolidating all the electrical lines 42 at the branch block 100. Multiple electrical lines 42 would be confined to the branch block inlet port 22 on the tree trunk and then branched off within the branch block 100 at the outlet port 24.

Figure 6:
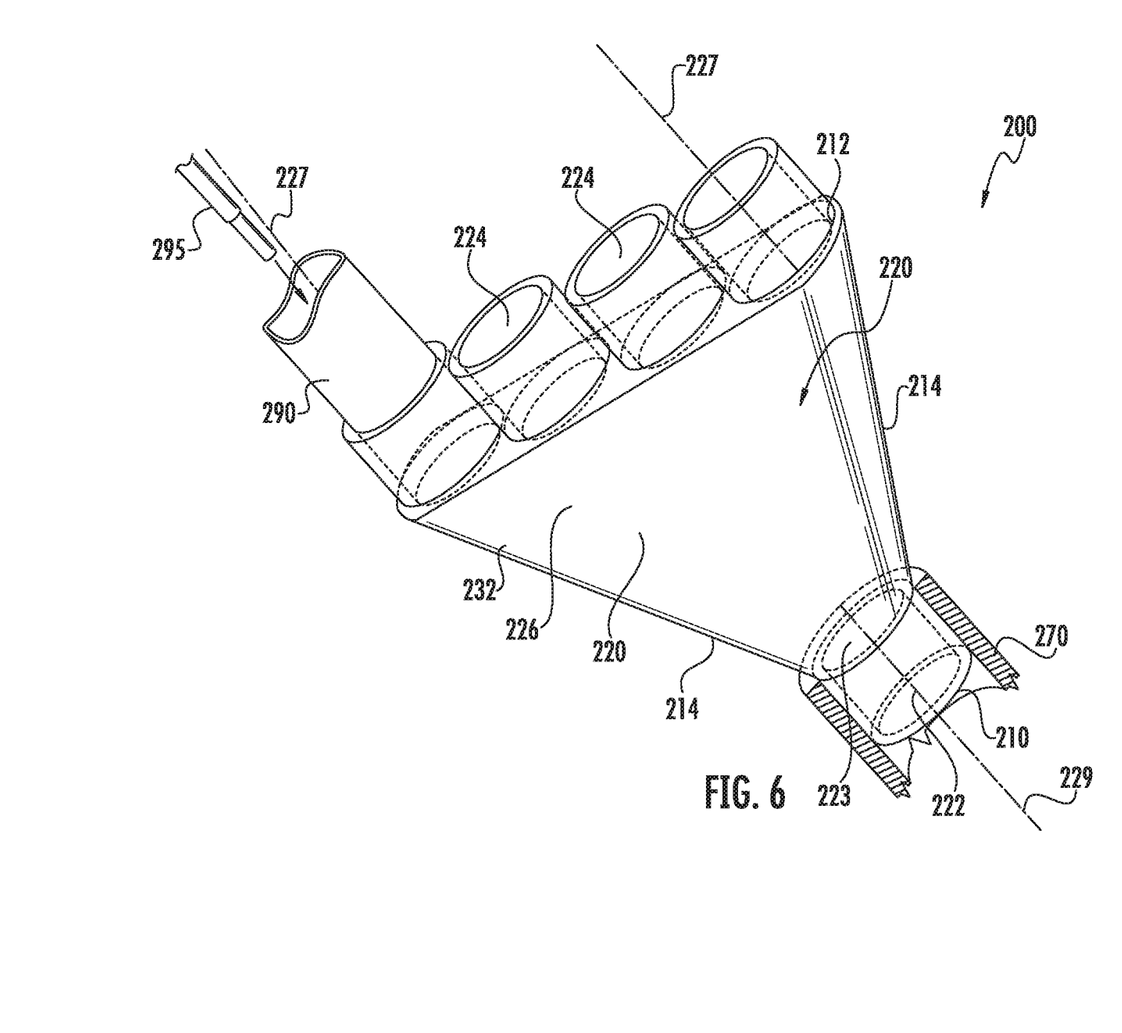
FIG. 6 is a cross-sectional perspective view of an alternative embodiment of the branch block.
Figure 7:
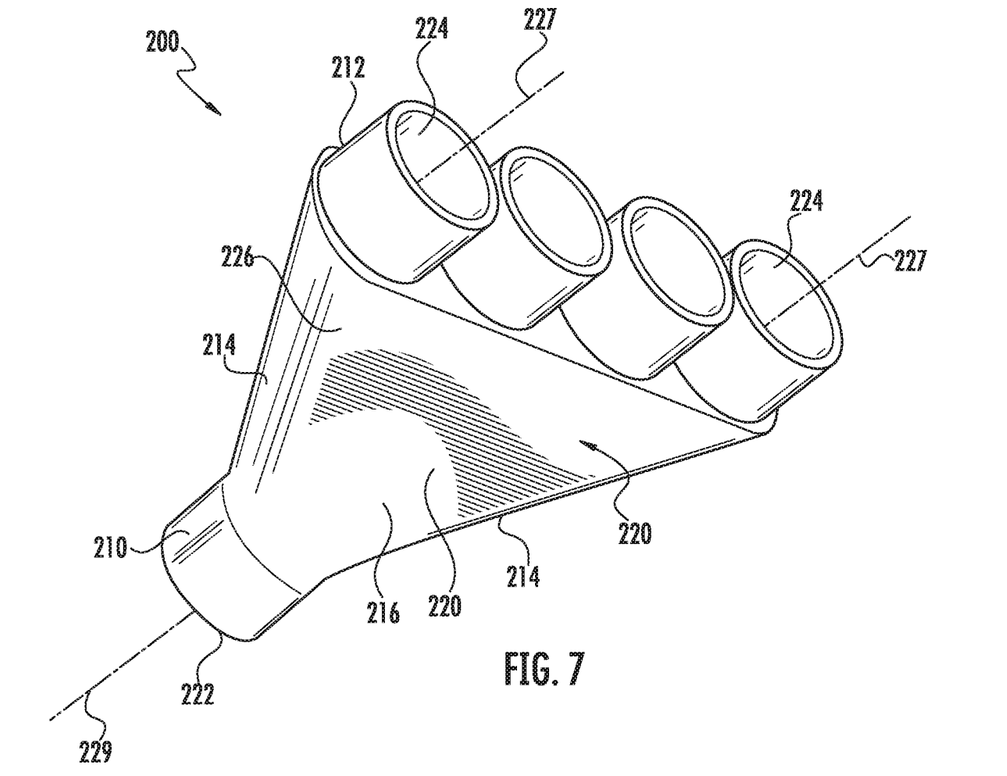
FIG. 7 is a perspective view of an alternative embodiment of the branch block.
Figure 8:
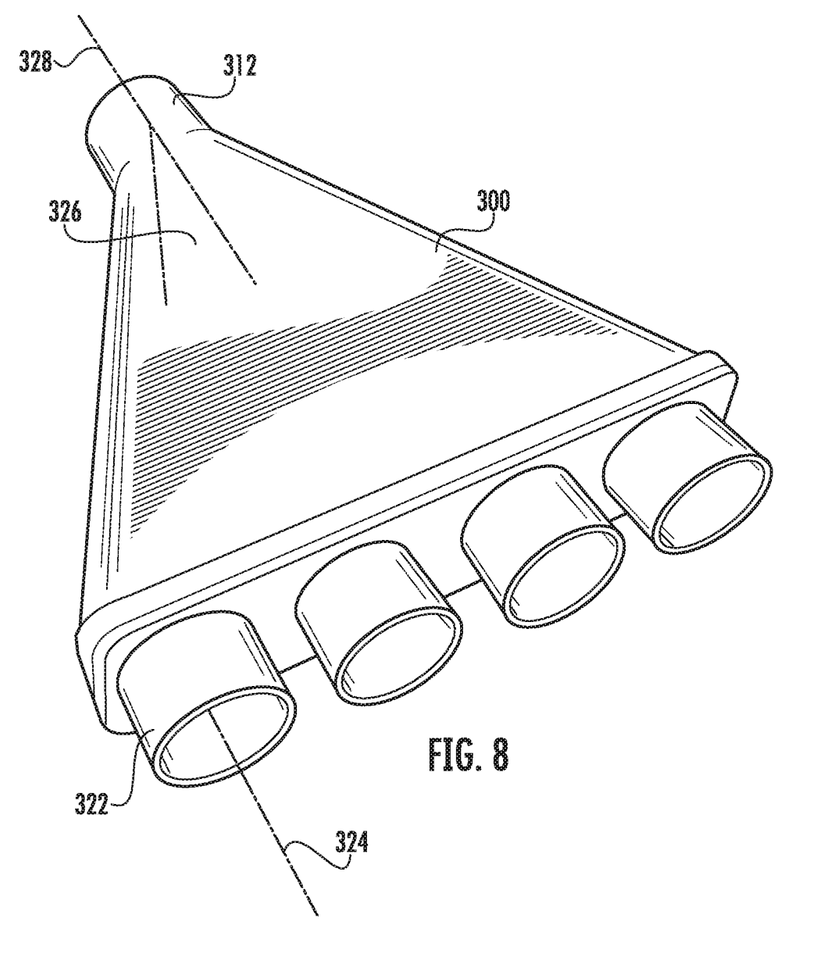
FIG. 8 is a top perspective view illustrating the overall shape of the branch block and the outlet ports.
Figure 9:
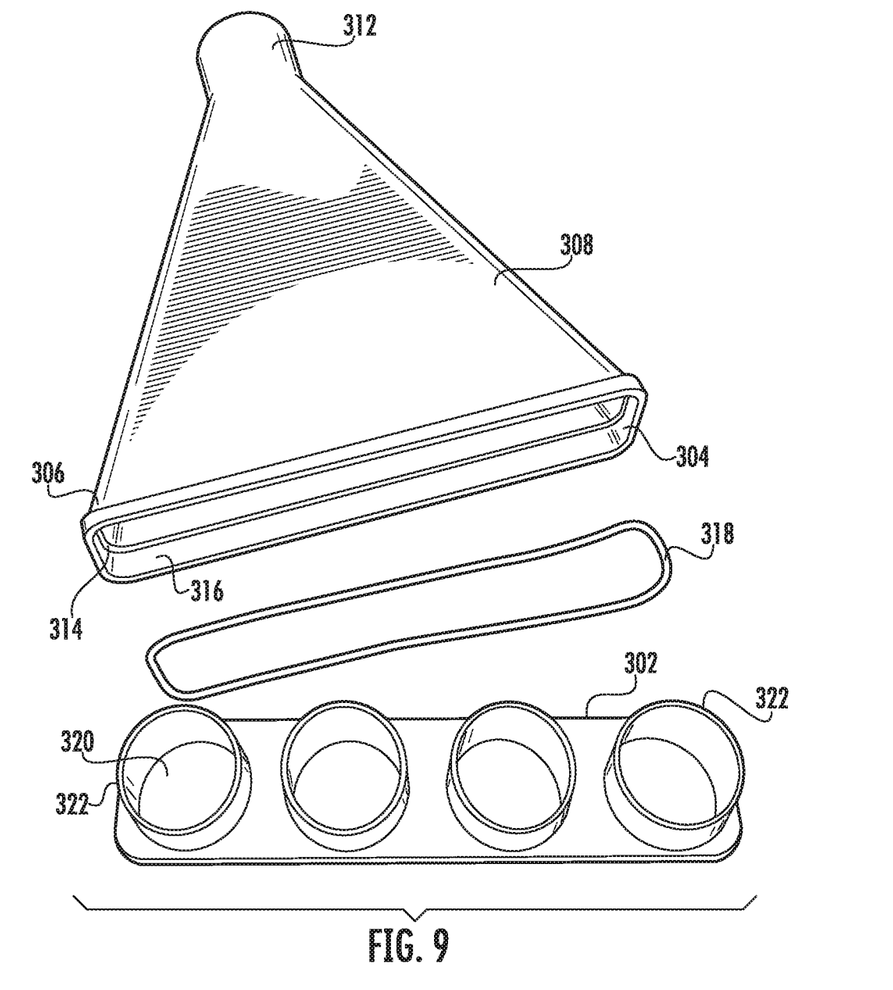
FIG. 9 is a top perspective view illustrating an alternative embodiment of the present invention having an interchangeable outlet plate allowing the number of outlet ports to be changed.
Figure 10:
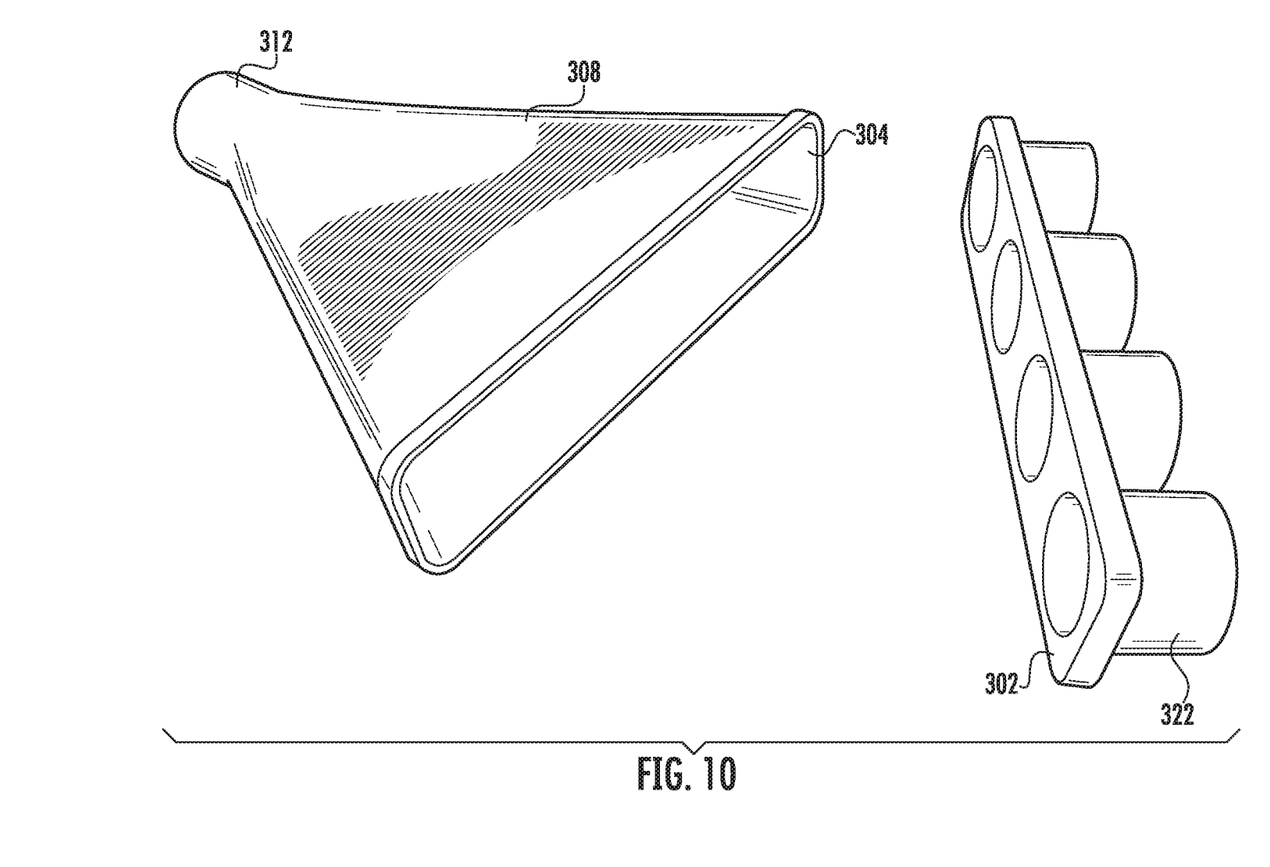
FIG. 10 is a top left perspective view illustrating the embodiment of FIG. 9.
Figure 11:
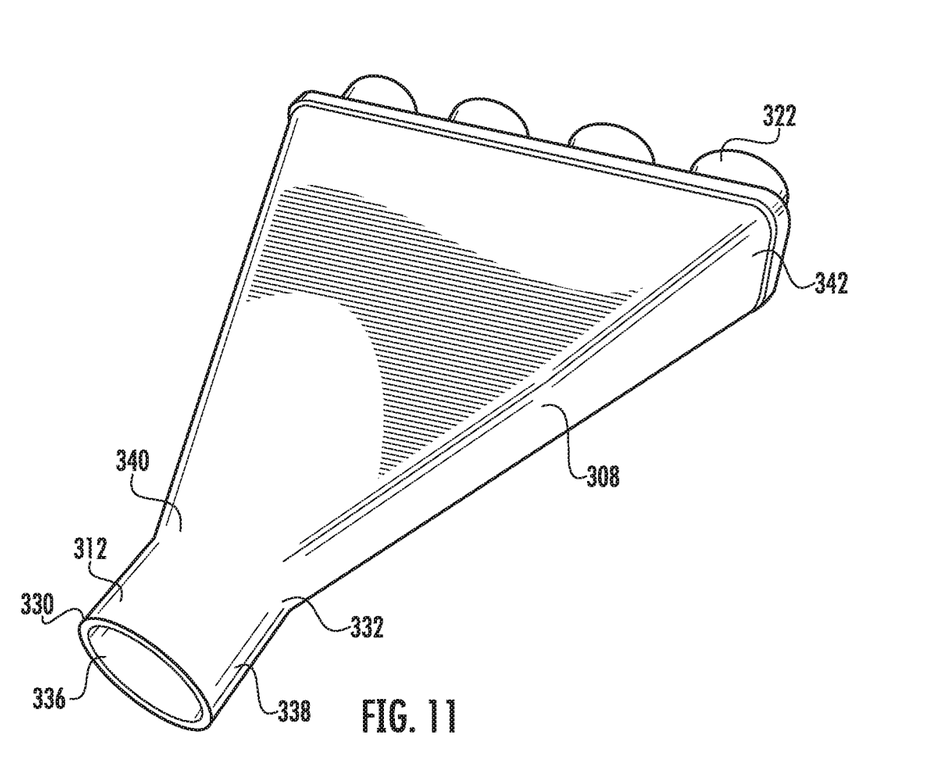
FIG. 11 is a perspective view of one embodiment of the present device illustrating the inlet port.

Alternative embodiments of the branch block are contemplated and shown in FIGS. 6 and 7. The branch block 200 is comprised of a plurality of sidewalls 210, 212, 214, a top wall 216, and a bottom wall 218 (not shown) to form a water resistant or watertight enclosure 220 having a generally parallelepiped shape, which may include tapered or otherwise shaped sections. The branch block 200 includes at least one inlet port 222 to a primary branch 223 that diverges into an open branch 226 and then a plurality of branch ports 224 nearest the sidewall 212 opposite the inlet port sidewall 210. The inlet port 222 and each branch port 224 are shaped and sized to cooperate with electrical conduits of various types to complete a seal between the branch block and the conduit. In this respect, the branch block may include seals in the form of O-rings, packing, compression, shark bite fittings, adhesive and the like (not shown). As discussed above, the seals may be constructed and arranged to cooperate with the outside surface of the conduit and the inside surface of the ports 222 and 224 to create a watertight, or at least a water resistant, attachment between the branch block 200 and the conduits. In some embodiments, the connection between the conduit and the branch block 200 may also be airtight, allowing the internal space to be filled with inert gas.

In the alternative embodiment shown in FIGS. 6 and 7, the primary branch 223 extends into the branch block 200 a short distance and thereafter divides into an open branch 226 having a continuous sidewall 232. The longitudinal centerline of the outermost branch ports 227 is preferably oriented at an obtuse angle with respect to the longitudinal centerline 229 of the inlet primary branch 223. In this manner, new wires may be routed or pulled from the branch ports 224 through the primary branch 223 and inlet port 222 without disassembly of the conduits 270 from the branch block 200. This provides a significant advantage over junction boxes of the prior art, which must be disassembled to reroute new wires through the conduits and the box. This construction provides flexibility with respect to the arrangement of the conduits, allowing them to flow outwardly from the branch block in several desired configurations that closely approximate the surfaces to which they are being attached for a smoother, more refined, appearance. As shown in FIG. 6, the branch block 200 may be constructed to include a large inlet conduit 270 for code requirements, while the outlet conduits 290 are smaller in size due to the amount of wires 295 being divided from the inlet conduit to the outlet conduits as per code requirements. This construction saves materials by not requiring all of the conduits to be the same size, while still conforming to local code requirements.

As discussed above (but not shown), the branch block 200 may be attached to a surface in a variety of ways, including tabs or apertures that extend through the body of the branch block. Keyway slots, tie wraps or the like may also be utilized, as is known in the art, for attaching the branch block to a desired surface or object. The branch block 200 is preferably constructed from a polymer, such as plastic, which may be glass or otherwise filled through the process of injection molding. However, it should be noted that the branch block 200 may be constructed from other materials suitable for use in the electrical field without departing from the scope of the invention.

Referring to FIGS. 8-11, an alternative embodiment of the branch block 300 is illustrated. This embodiment includes a manifold plate 302 shaped to extend across the perimeter to the perimeter wall 304 of the outlet portion 306 of the body portion 308 to cover the hollow interior of the body portion and to support the branch ports 322 in a spaced apart relationship with respect to the inlet port 312. In a preferred embodiment, the outlet portion 306 of the body portion 308 includes a step 314 having a face surface 316 and a perimeter wall 304 to position the manifold plate 302. In this manner, fasteners, adhesives, radio frequency welding and the like may be utilized to secure the manifold plate 302 to the body portion 308. In at least some embodiments, an O-ring or gasket 318 may be used to provide an additional seal between the body 308 and the manifold plate 302. The manifold plate 302 includes at least two, and more preferably four apertures 320 extending through the manifold plate 302. The branch ports 322 are generally tubular in shape, and more preferably cylindrical to cooperate with electrical conduit, which is well known in the art. However, it should be noted that as long as the branch port and the conduit have the same or conjugate shapes, any shape suitable for passage of wires or fiber optic cables may be utilized without departing from the scope of the invention. The branch ports are preferably integrally formed to the manifold plate, but may be secured by any method suitable to secure the branch ports to the manifold. In a most preferred embodiment, the branch ports are secured to the manifold plate in a watertight manner. The branch ports 322 are positioned on the manifold plate 302 so that a longitudinal centerline 324 of the outermost branch port 322 is oriented at an obtuse angle 326 with respect to the longitudinal centerline 328 of the inlet port 312. The construction permits a wire to be inserted through the branch port 322 where the body portion 300 directs the wire to the inlet port 312 and through any conduit that may be connected to the inlet port. The inlet port 312 is formed as a hollow cylindrical member having a first end 330 and a second end 332, an internal bore 336 and an outer diameter 338, the first end of the outer diameter sized to cooperate with an inner diameter of an electrical conduit, the second end of the inlet port integrally formed to the body portion 308, the body portion being tubular and having an inlet end 340 sized and shaped to approximate the size and shape of the second end of the inlet port, an outlet end 342 larger in diameter than the inlet end and shaped to accept at least two branch ports 322 and more preferably four branch ports in a side by side arrangement.

All patents and publications mentioned in this specification are indicative of the levels of those skilled in the art to which the invention pertains.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A branch block for connecting electrical conduit for constructing electrical pathways comprising:

an inlet port formed as a hollow cylindrical member having a first end and a second end, an internal bore and an outer diameter, said first end of said outer diameter cooperating with an inner diameter of an electrical conduit in an overlapping manner, said second end of said inlet port integrally formed to a body portion, said body portion being tubular and having an inlet end sized and shaped to approximate the size and shape of the second end of said inlet port to provide a continuous inner wall therebetween, said body portion tapering to an outlet end larger in diameter than said inlet end and shaped to accept at least two branch ports in a side by side arrangement, a manifold plate covering said outlet end of said body portion, said manifold plate having a plurality of apertures, a respective aperture sized to cooperate with each respective said branch port, said branch ports cylindrical in shape having a first branch port end sealably secured to said manifold plate to circumscribe one of said apertures, each said branch port having an internal diameter and an outside diameter, each said branch port internal diameter being sized to accept a second electrical conduit in an overlapping manner to create a watertight connection therebetween, each said branch port providing an unobstructed pathway for an electrical wire to be pushed through a respective said branch port to and through said inlet port, said body portion directing said electrical wire through said internal bore of said inlet port irrespective of which said branch port said electrical wire is pushed through, wherein the wire is hidden from view.

2. The branch block of claim 1 wherein said branch ports are integrally formed to said manifold plate.

3. The branch block of claim 1 wherein said manifold plate is integrally formed to said outlet end of said body portion.

4. The branch block of claim 1 wherein said manifold plate is secured to said outlet end of said body portion with fasteners, a seal extending around a perimeter of said outlet end of said body portion and cooperating with a back surface of said manifold plate to create a watertight seal therebetween.

5. The branch block of claim 1 wherein said seal is an O-ring.

6. The branch block of claim 1 wherein said manifold plate is secured to said outlet end of said body portion by adhesive.

7. The branch block of claim 1 wherein said inner bore of said inlet port is sized to cooperate with an outside diameter of said electrical conduit.

8. The branch block of claim 1 wherein an outside diameter of each said branch port is sized to cooperate with an inner diameter of said second electrical conduit.

9. The branch block of claim 1 wherein said body portion includes at least one divider, said at least one divider positioned between said side by side branch port apertures.

10. The branch block of claim 1 wherein a longitudinal centerline of the outermost said branch port is oriented at an obtuse angle with respect to the longitudinal centerline of said inlet port.

11. The branch block of claim 1 wherein said manifold plate includes 4 branch ports.

12. The branch block of claim 1 wherein said body portion includes at least one tab for securing said branch block to a mounting surface.

13. The branch block of claim 1 wherein said branch block is constructed from a polymer.

14. The branch block of claim 13 wherein said polymer is plastic.

15. The branch block of claim 14 wherein said plastic is glass filled.

* * * * *